(12) United States Patent
Henry et al.

(10) Patent No.: US 11,859,316 B2
(45) Date of Patent: Jan. 2, 2024

(54) PROCESS FOR THE PRODUCTION OF FIBERS

(71) Applicant: TOTALENERGIES ONETECH BELGIUM, Seneffe (BE)

(72) Inventors: Gaetan Henry, Bovesse (BE); Guillaume Pavy, Brussels (BE); John Bieser, Houston, TX (US); Hugues Haubruge, Walhain (BE); Alain Standaert, Brussels (BE)

(73) Assignee: TOTALENERGIES ONETECH BELGIUM, Seneffe (BE)

( * ) Notice: Subject to any disclaimer, the term of this patent is extended or adjusted under 35 U.S.C. 154(b) by 518 days.

(21) Appl. No.: 17/084,859

(22) Filed: Oct. 30, 2020

(65) Prior Publication Data

US 2021/0047755 A1 Feb. 18, 2021

Related U.S. Application Data

(63) Continuation of application No. 14/241,277, filed as application No. PCT/EP2012/066677 on Aug. 28, 2012, now abandoned.

(60) Provisional application No. 61/528,910, filed on Aug. 30, 2011.

(30) Foreign Application Priority Data

Sep. 22, 2011 (EP) .................................. 11182280

(51) Int. Cl.
| | |
|---|---|
| C08F 2/02 | (2006.01) |
| C08F 4/6592 | (2006.01) |
| C08F 210/06 | (2006.01) |
| C08L 23/14 | (2006.01) |
| D01D 1/04 | (2006.01) |
| D01D 5/098 | (2006.01) |
| D01D 5/12 | (2006.01) |
| D01D 7/00 | (2006.01) |
| D04H 3/16 | (2006.01) |
| D01F 6/30 | (2006.01) |
| D01F 6/06 | (2006.01) |
| D01D 5/08 | (2006.01) |
| D04H 1/4291 | (2012.01) |
| D04H 3/007 | (2012.01) |

(52) U.S. Cl.
CPC ................. *D01F 6/30* (2013.01); *D01D 5/08* (2013.01); *D01D 5/0985* (2013.01); *D01F 6/06* (2013.01); *D04H 1/4291* (2013.01); *D04H 3/007* (2013.01); *C08F 4/65922* (2013.01); *C08F 4/65925* (2013.01); *D10B 2321/022* (2013.01); *Y10T 442/682* (2015.04)

(58) Field of Classification Search
CPC ...... C08F 2/02; C08F 4/6592; C08F 4/65922; C08F 4/65925; C08F 4/65927; C08F 210/06; C08L 23/14; D01D 1/04; D01D 5/08; D01D 5/098; D01D 5/12; D01D 5/16; D01D 7/00; D01F 6/30; D04H 3/007; D04H 3/16
USPC ..... 264/103, 210.8, 211.12, 331.17; 156/181
See application file for complete search history.

(56) References Cited

U.S. PATENT DOCUMENTS

| | | | | |
|---|---|---|---|---|
| 5,763,080 A | * | 6/1998 | Stahl | D04H 3/007 428/394 |
| 6,342,565 B1 | * | 1/2002 | Cheng | C08L 23/142 525/240 |
| 6,476,172 B1 | * | 11/2002 | Wachowicz | D01F 6/30 264/210.8 |
| 2004/0014224 A1 | * | 1/2004 | Lopez | B01J 19/0046 422/400 |
| 2008/0172840 A1 | * | 7/2008 | Kacker | D04H 3/16 525/240 |

\* cited by examiner

*Primary Examiner* — Leo B Tentoni
(74) *Attorney, Agent, or Firm* — CONLEY ROSE, P.C.

(57) ABSTRACT

Fibers can include a polypropylene composition, which can include a metallocene random copolymer of propylene and a comonomer that is an alpha-olefin different from propylene. The metallocene random copolymer can have a comonomer content of from 1.2 wt % to 1.8 wt %, a molecular weight distribution of at least 1.0 and of at most 4.0 obtained without thermal or chemical degradation, and a melting temperature $T_{melt}$ of at most 140° C. A nonwoven can include the fibers, and a laminate can include the nonwoven. The fibers can be produced by polymerizing the propylene and comonomer in presence of a metallocene-based polymerization catalyst to obtain the metallocene random copolymer. The polypropylene composition can be melt-extruded to obtain a molten polypropylene stream, which can be extruded from capillaries of a spinneret to obtain filaments. A diameter of the filaments can be rapidly reduced to obtain a final diameter.

16 Claims, No Drawings

PROCESS FOR THE PRODUCTION OF FIBERS

CROSS-REFERENCE TO RELATED APPLICATIONS

This application is a continuation of U.S. patent application Ser. No. 14/241,277, filed on Jun. 20, 2014, which claims the benefit of PCT/EP2012/066677, filed on Aug. 28, 2012, which claims priority from U.S. Provisional Application No. 61/528,910, filed on Aug. 30, 2011, and European Application No. 11182280.5, filed on Sep. 22, 2011.

FIELD OF THE INVENTION

The present application relates to fibers and nonwovens comprising a polypropylene composition, which in turn comprises a specific propylene random copolymer. Further, the present application relates to the production of such fibers and nonwovens.
The Technical Problem and the Prior Art The combination of mechanical and physical properties together with good processability has made polypropylene the material of choice for a large number of fiber and nonwoven applications, such as for construction and agricultural industries, sanitary and medical articles, carpets, textiles.

With the commercialization of polypropylenes produced with metallocene-based polymerization catalysts, frequently referred to as "metallocene polypropylenes", the use of polypropylene has even further expanded into new applications for which properties other than mechanical ones are important. It has for example been tried to improve softness and drape of nonwovens by using metallocene polypropylenes and producing finer fibers therewith. While this approach has led to some success there is nevertheless a need for improvement, particularly when both, softness and drape, are to be attained.

Additionally, the increasing scarcity of energy and raw materials necessitates further downgauging of the resulting fibers and nonwovens as well as a more energy efficient production of such fibers and nonwovens.

It is therefore an objective of the present invention to provide fibers that are characterized by good bonding properties.

It is also an object of the present invention to provide fibers and nonwovens that are characterized by acceptable mechanical properties.

Further, it is an object of the present invention to provide fibers and nonwovens that are characterized by improved softness or drape or a combination of both.

In addition, it is an object of the present invention to provide a process for the production of such fibers and nonwovens, said process being characterized by good processability of the fibers.

Furthermore, it is an object of the present invention to provide a process for the production of such nonwovens, said process being characterized by reduced energy consumption.

BRIEF DESCRIPTION OF THE INVENTION

We have now discovered that the above objects can be met, either individually or in any combination, by fibers and nonwovens comprising a polypropylene composition, said polypropylene composition in turn comprising a specific propylene random copolymer as well as by a process for their production.

Thus, the present application provides for fibers comprising a polypropylene composition, said polypropylene composition comprising a metallocene random copolymer of propylene and at least one comonomer, wherein said metallocene random copolymer has a comonomer content of from 1.2 wt % to 1.8 wt %, relative to the total weight of said metallocene random copolymer, and the at least one comonomer is an alpha-olefin different from propylene, and wherein said metallocene random copolymer has a molecular weight distribution, defined as $M_w/M_n$ and determined by size extrusion chromatography, of at least 1.0 and of at most 4.0, obtained without thermal or chemical degradation.

The present application also provides for a nonwoven comprising such fibers and for laminates comprising such nonwoven.

Further, the present application provides for a process for the production of fibers comprising the steps of
  (a) polymerizing propylene and at least one comonomer in presence of a metallocene-based polymerization catalyst, to obtain a metallocene random copolymer of propylene and at least one comonomer,
  (b) melt-extruding a polypropylene composition comprising the metallocene random copolymer obtained in step (a) to obtain a molten polypropylene stream,
  (c) extruding the molten polypropylene stream of step (b) from a number of fine, usually circular, capillaries of a spinneret, thus obtaining filaments of molten polypropylene, and
  (d) subsequently rapidly reducing the diameter of the filaments obtained in the previous step to obtain a final diameter,
wherein said metallocene random copolymer has a comonomer content of from 1.2 wt % to 1.8 wt %, relative to the total weight of said metallocene random copolymer, and the at least one comonomer is an alpha-olefin different from propylene, and wherein said metallocene random copolymer has a molecular weight distribution, defined as $M_w/M_n$ and determined by gel permeation chromatography, of from 1.0 to 3.0, obtained without thermal or chemical degradation. Said metallocene random copolymer has a melting temperature $T_{melt}$, determined by Differential Scanning Calorimetry according to ISO 3146, of at most 140° C.

DETAILED DESCRIPTION OF THE INVENTION

Throughout the present application the terms "polypropylene" and "propylene polymer" may be used synonymously.

Throughout the present application the term "propylene random copolymer" may be used to denote a "random copolymer of propylene and at least one comonomer". The terms "metallocene propylene random copolymer" or "metallocene random copolymer" may be used to denote a "random copolymer of propylene and at least one comonomer having been produced with a metallocene-based polymerization catalyst".

Throughout the present application the melt flow index, abbreviated as "MFI", of polypropylene and polypropylene compositions is determined according to ISO 1133, condition L, at 230° C. and 2.16 kg.

In general terms, the present invention provides for fibers comprising a polypropylene composition, which in turn comprises a specific metallocene random copolymer of propylene and at least one comonomer as defined below.

Optionally, the present fibers may comprise one or more further components other than said polypropylene composition, in which case it is preferred that said polypropylene composition forms an exterior component and the one or more further components form interior components, with each of the interior components consisting of a thermoplastic polymer composition as defined below, provided that the thermoplastic polymer compositions are not identical. It is, however, not explicitly excluded that the polypropylene composition forms an interior component and the exterior component consists of a thermoplastic polymer composition.

The term "exterior component" is used to denote the component of the fibers covering at least 70%, more preferably at least 80%, even more preferably at least 90%, still even more preferably at least 99% of the surface of said fibers, and most preferably covers the entire surface of said fibers.

Polypropylene Composition

Preferably the polypropylene composition used herein comprises said metallocene random copolymer in at least 50 wt % or 70 wt %, more preferably in at least 80 wt % or 90 wt %, even more preferably in at least 95 wt % or 97 wt %, and still even more preferably in at least 99 wt %, relative to the total weight of said metallocene random copolymer. Most preferably, the polypropylene composition consists of the metallocene random copolymer. The remainder of said polypropylene composition may be one or more thermoplastic polymers as defined below, provided that the relative weights of all components of the polypropylene composition add up to 100 wt %.

The metallocene random copolymer comprised in the polypropylene composition used herein is a random copolymer of propylene and at least one comonomer, said comonomer being an alpha-olefin different from propylene. Preferably, the alpha-olefin is an alpha-olefin having from one to ten carbon atoms. More preferably, the alpha-olefin is selected from the group consisting of ethylene, butene-1, pentene-1, hexene-1, heptene-1, hexene-1 and 4-methylpentene-1. Even more preferably, the alpha-olefin is selected from the group consisting of ethylene, butene-1 and hexene-1. Most preferably, the alpha-olefin is ethylene. Hence, the most preferred random copolymer is a random copolymer of propylene and ethylene.

The metallocene random copolymer used herein has a comonomer content of at least 1.2 wt %, preferably of at least 1.3 wt % and most preferably of at least 1.4 wt %. Said random copolymer has a comonomer content of at most 1.8 wt %, preferably of at at most 1.7 wt % and most preferably of at most 1.6 wt %. The comonomer content is given in wt % relative to the total weight of said random copolymer.

Preferably, the metallocene random copolymer used herein has a melt flow index of at least 15 dg/min, more preferably of at least 20 dg/min and most preferably of at least 25 dg/min. Preferably, it has a melt flow index of at most 100 dg/min, more preferably of at most 90 dg/min, even more preferably of at most 70 dg/min, and most preferably of at most 50 dg/min.

Preferably, the metallocene random copolymer used herein has a high degree of isotacticity, for which the content of mmmm pentads is a measure. Thus, preferably the content of mmmm pentads is at least 90%, more preferably at least 92%, even more preferably at least 94% and most preferably at least 96%. The content of mmmm pentads may be determined by $^{13}$C-NMR analysis as described in the test methods.

Further, the metallocene random copolymer used herein preferably has a content of 2.1-insertions of at most 1.5%, more preferably of at most 1.3%, even more preferably of at most 1.2%, still even more preferably of at most 1.1% and most preferably of at most 1.0%. Preferably the content of 2.1-insertions is at least 0.1%. The percentage of 2.1-insertions is given relative to the total number of propylene monomers in the polymeric chain and may be determined by $^{13}$C-NMR analysis as given in more detail in the test methods.

Preferably the metallocene random copolymer used herein has at least 90% of the at least one comonomer as isolated units. The percentage of isolated units is given relative to the total number of comonomer units in the polymeric chain. The term "isolated unit" is used to denote that in the polymeric chain a comonomer unit is surrounded by propylene units only. The content of isolated units may be determined by $^{13}$C-NMR analysis as indicated in the test methods.

Preferably, the metallocene random copolymer used herein has a molecular weight distribution, defined as $M_w/M_n$, i.e. the ratio of weight average molecular weight $M_w$ over number average molecular weight $M_n$, of at most 4.0. Preferably, the random copolymer used herein has a molecular weight distribution, defined as $M_w/M_n$, of at most 3.5, more preferably of at most 3.0, and most preferably of at most 2.8. Preferably, the random copolymer used herein has a molecular weight distribution (MWD), defined as $M_w/M_n$, of at least 1.0, more preferably of at least 1.5 and most preferably of at least 2.0. Molecular weights can be determined by size exclusion chromatography (SEC), frequently also referred to as gel permeation chromatography (GPC), as described in the test methods.

Preferably, the metallocene random copolymer used herein has a melting temperature $T_{melt}$, determined by Differential Scanning Calorimetry according to ISO 3146, of at most 140° C., preferably at most 138° C., more preferably at most 136° C., most preferably 135° C.

The metallocene random copolymer used herein is obtained by polymerizing propylene and at least one comonomer with a metallocene-based polymerization catalyst. Preferably the metallocene-based polymerization catalyst comprises a bridged metallocene component, a support and an activating agent. Such metallocene-based polymerization catalysts are generally known in the art and need not be explained in detail.

The metallocene component can be described by the following general formula $$(\mu\text{-}R^a)(R^b)(R^c)MX^1X^2 \qquad (I)$$

wherein $R^a$, $R^b$, $R^c$, M, $X^1$ and $X^2$ are as defined below.

$R^a$ is the bridge between $R^b$ and $R^c$, i.e. $R^a$ is chemically connected to $R^b$ and $R^c$, and is selected from the group consisting of —$(CR^1R^2)_p$—, —$(SiR^1R^2)_p$—, —$(GeR^1R^2)_p$—, —$(NR^1)_p$—, —$(PR^1)_p$—, —$(N^+R^1R^2)_p$— and —$(P^+R^1R^2)_p$—, and p is 1 or 2, and wherein $R^1$ and $R^2$ are each independently selected from the group consisting of hydrogen, $C_1$-$C_{10}$ alkyl, $C_5$-$C_8$ cycloalkyl, $C_6$-$C_{15}$ aryl, alkylaryl with $C_1$-$C_{10}$ alkyl and $C_6$-$C_{15}$ aryl, or any two neighboring R (i.e. two neighboring $R^1$, two neighboring $R^2$, or $R^1$ with a neighboring $R^2$) may form a cyclic saturated or non-saturated $C_4$-$C_{10}$ ring; each $R^1$ and $R^2$ may in turn be substituted in the same way. Preferably $R^a$ is —$(CR^1R^2)_p$— or —$(SiR^1R^2)_p$— with $R^1$, $R^2$ and p as defined above. Most preferably $R^a$ is —$(SiR^1R^2)_p$— with $R^1$, $R^2$ and p as defined above. Specific examples of $R^a$ include $Me_2C$, ethanediyl (—$CH_2$—$CH_2$—), $Ph_2C$ and $Me_2Si$.

M is a metal selected from Ti, Zr and Hf, preferably it is Zr.

$X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_6$-$C_{15}$ aryl. Preferably $X^1$ and $X^2$ are halogen or methyl.

$R^b$ and $R^c$ are selected independently from one another and comprise a cyclopentadienyl ring.

Preferred examples of halogen are Cl, Br, and I. Preferred examples of $C_1$-$C_{10}$ alkyl are methyl, ethyl, n-propyl, isopropyl, n-butyl, iso-butyl, and tert-butyl. Preferred examples of $C_5$-$C_7$ cycloalkyl are cyclopentyl, cyclohexyl, cycloheptyl and cyclooctyl. Preferred examples of $C_6$-$C_{15}$ aryl are phenyl and indenyl. Preferred examples of alkylaryl with $C_1$-$C_{10}$ alkyl and $C_6$-$C_{15}$ aryl are benzyl (—$CH_2$-Ph), and —$(CH_2)_2$-Ph.

Preferably, $R^b$ and $R^c$ may both be substituted cyclopentadienyl, or may be independently from one another unsubstituted or substituted indenyl or tetrahydroindenyl, or $R^b$ may be a substituted cyclopentadienyl and $R^c$ a substituted or unsubstituted fluorenyl. More preferably, $R^b$ and $R^c$ may both be the same and may be selected from the group consisting of substituted cyclopentadienyl, unsubstituted indenyl, substituted indenyl, unsubstituted tetrahydroindenyl and substituted tetrahydroindenyl. By "unsubstituted" is meant that all positions on $R^b$ resp. $R^c$, except for the one to which the bridge is attached, are occupied by hydrogen. By "substituted" is meant that, in addition to the position at which the bridge is attached, at least one other position on $R^b$ resp. $R^c$ is occupied by a substituent other than hydrogen, wherein each of the substituents may independently be selected from the group consisting of $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring substituents may form a cyclic saturated or non-saturated $C_4$-$C_{10}$ ring.

A substituted cyclopentadienyl may for example be represented by the general formula $C_5R^3R^4R^5R^6$. A substituted indenyl may for example be represented by the general formula $C_9R^7R^8R^9R^{10}R^{11}R^{12}R^{13}R^{14}$. A substituted tetrahydroindenyl may for example be represented by the general formula $CH_4R^{15}R^{16}R^{17}R^{18}$. A substituted fluorenyl may for example be represented by the general formula $C_{13}R^{19}R^{20}R^{21}R^{22}R^{23}R^{24}R^{25}R^{26}$ Each of the substituents $R^3$ to $R^{26}$ may independently be selected from the group consisting of hydrogen, $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-Cis aryl, or any two neighboring R may form a cyclic saturated or non-saturated $C_4$-$C_{10}$ ring; provided, however, that not all substituents simultaneously are hydrogen.

Preferred metallocene components are those having $C_2$-symmetry or those having $C_1$-symmetry. Most preferred are those having $C_2$-symmetry.

Particularly suitable metallocene components are those wherein $R^b$ and $R^c$ are the same and are substituted cyclopentadienyl, preferably wherein the cyclopentadienyl is substituted in the 2-position, the 3-position, or simultaneously the 2-position and the 3-position.

Particularly suitable metallocene components are also those wherein $R^b$ and $R^c$ are the same and are selected from the group consisting of unsubstituted indenyl, unsubstituted tetrahydroindenyl, substituted indenyl and substituted tetrahydroindenyl. Substituted indenyl is preferably substituted in the 2-position, the 3-position, the 4-position, the 5-position or any combination of these, more preferably in the 2-position, the 4-position or simultaneously in the 2-position and the 4-position. Substituted tetrahydroindenyl is preferably substituted in the 2-position, the 3-position, or simultaneously the 2-position and the 3-position.

Particularly suitable metallocene components may also be those wherein $R^b$ is a substituted cyclopentadienyl and $R^c$ is a substituted or unsubstituted fluorenyl. The substituted cyclopentadienyl is preferably substituted in the 2-position, the 3-position, the 5-position or simultaneously any combination of these, more preferably in the 3-position or the 5-position or both simultaneously, most preferably in the 3-position only, with a bulky substituent. Said bulky substituent may for example be —$CR^{27}R^{28}R^{29}$ or —$SiR^{27}R^{28}R^{29}$ with $R^{27}$, $R^{28}$ and $R^{29}$ independently selected from group consisting of $C_1$-$C_{10}$ alkyl, $C_1$-$C_7$ cycloalkyl, $C_6$-$C_{15}$ aryl, and alkylaryl with $C_1$-$C_{10}$ alkyl and $C_6$-$C_{15}$ aryl, or any two neighboring R may form a cyclic saturated or non-saturated $C_4$-$C_{10}$ ring. it is preferred that $R^{27}$, $R^{28}$ and $R^{29}$ are methyl.

Examples of Particularly Suitable Metallocenes are dimethylsilanediyl-bis(2-methyl-cyclopentadienyl)zirconium dichloride,
dimethylsilanediyl-bis(3-methyl-cyclopentadienyl)zirconium dichloride,
dimethylsilanediyl-bis(3-tert-butyl-cyclopentadienyl)zirconium dichloride,
dimethylsilanediyl-bis(3-tert-butyl-5-methyl-cyclopentadienyl)zirconium dichloride,
dimethylsilanediyl-bis(2,4-dimethyl-cyclopentadienyl)zirconium dichloride,
dimethylsilanediyl-bis(indenyl)zirconium dichloride,
dimethylsilanediyl-bis(2-methyl-indenyl)zirconium dichloride,
dimethylsilanediyl-bis(3-methyl-indenyl)zirconium dichloride,
dimethylsilanediyl-bis(3-tert-butyl-indenyl)zirconium dichloride,
dimethylsilanediyl-bis(4,7-dimethyl-indenyl)zirconium dichloride,
dimethylsilanediyl-bis(tetrahydroindenyl)zirconium dichloride,
dimethylsilanediyl-bis(benzindenyl)zirconium dichloride,
dimethylsilanediyl-bis(3,3'-2-methyl-benzindenyl)zirconium dichloride,
dimethylsilanediyl-bis(4-phenyl-indenyl)zirconium dichloride,
dimethylsilanediyl-bis(2-methyl-4-phenyl-indenyl)zirconium dichloride,
ethanediyl-bis(indenyl)zirconium dichloride,
ethanediyl-bis(tetrahydroindenyl)zirconium dichloride,
isopropylidene-(3-tert-butyl-cyclopentadienyl)(fluorenyl) zirconium dichloride isopropylidene-(3-tert-butyl-5-methyl-cyclopentadienyl)(fluorenyl) zirconium dichloride.

The metallocene may be supported according to any method known in the art. In the event it is supported, the support used in the present invention can be any organic or inorganic solid, particularly porous supports such as talc, inorganic oxides, and resinous support material such as polyolefin. Preferably, the support material is an inorganic oxide in its finely divided form.

The metallocene random copolymer used herein is produced by polymerizing propylene and at least one comonomer in presence of a metallocene-based polymerization catalyst to obtain the metallocene random copolymer of propylene and at least one comonomer. The polymerization of propylene and the at least one comonomer in presence of a metallocene-based polymerization catalyst can be carried out according to known techniques in one or more polymerization reactors at temperatures in the range from 20° C. to 150° C. The metallocene random copolymer used herein is preferably produced by polymerization in liquid propylene at temperatures in the range from 20° C. to 120° C. More preferred temperatures are in the range from 60° C. to 100° C. The pressure can be atmospheric or higher. It is preferably between 25 and 50 bar. The molecular weight of the polymer chains, and in consequence the melt flow of the resulting metallocene propylene random copolymer, may be controlled by the addition of hydrogen to the polymerization medium.

Preferably, the metallocene random copolymer is recovered from the one or more polymerization reactors without post-reactor treatment, such as thermal or chemical degradation (e.g. by using peroxides), to reduce its molecular weight and/or narrow the molecular weight distribution, as is often done for polypropylene produced with a Ziegler-Natta catalyst. An example for chemical degradation is visbreaking, wherein the polypropylene is reacted for example with an organic peroxide at elevated temperatures, for example in an extruder or pelletizing equipment.

The polypropylene composition used herein may further comprise one or more thermoplastic polymers different from the metallocene random copolymer as defined above.

Irrespectively of the number of components, which are comprised in the polypropylene polymer composition, it is understood that their weight percentages, relative to the total weight of said polypropylene composition, add up to 100 wt %.

Preferred suitable thermoplastic polymers may be selected from the group consisting of polyolefins, polyamides and polyesters, with the provision that the polyolefin is different from the metallocene polypropylene used herein. By "different from the metallocene polypropylene" is meant that the polyolefin differs in at least one characteristic from the above defined metallocene polypropylene. Said polyolefin may for example be different in composition, such as for example be based on an alpha-olefin different from propylene (e.g. ethylene, 1-butene, 1-pentene, 1-hexene or 1-octene), or be produced with a Ziegler-Natta catalyst instead of a metallocene-based polymerization catalyst, or have a different type of comonomer, or have a different content of comonomer, or have a different melt flow index.

Exemplary polyolefins for use herein are olefin homopolymers and copolymers of an olefin and one or more comonomers. The polyolefins may be atactic, syndiotactic or isotactic. The olefin can for example be ethylene, propylene, 1-butene, 1-pentene, 1-hexene, 4-methyl-1-pentene or 1-octene, but also cycloolefins such as for example cyclopentene, cyclohexene, cyclooctene or norbornene. The comonomer is different from the olefin and chosen such that it is suited for copolymerization with the olefin. The comonomer may also be an olefin as defined above. Further examples of suitable comonomers are vinyl acetate ($H_3C$—$C(=O)O$—$CH=CH_2$) or vinyl alcohol ("$HO$—$CH=CH_2$", which as such is not stable and tends to polymerize). Examples of olefin copolymers suited for use in the present invention are random copolymers of propylene and ethylene, random copolymers of propylene and 1-butene, heterophasic copolymers of propylene and ethylene, ethylene-butene copolymers, ethylene-hexene copolymers, ethylene-octene copolymers, copolymers of ethylene and vinyl acetate (EVA), copolymers of ethylene and vinyl alcohol (EVOH).

Exemplary polyamides for use herein may be characterized in that the polymer chain comprises amide groups (—NH—C(=O)—). Polyamides useful in the present invention are preferably characterized by one of the following chemical structures

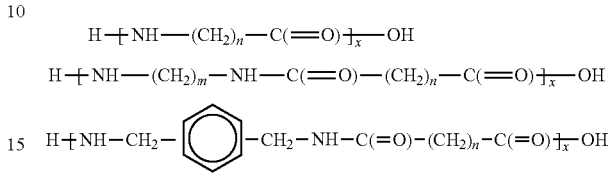

wherein m and n may be independently chosen from one another and be an integer from 1 to 20.

Specific examples of suitable polyamides are polyamides 4, 6, 7, 8, 9, 10, 11, 12, 46, 66, 610, 612, or 613. Another example of a suitable polyamide is Nylon-MXD6, obtainable by polycondensation of meta-xylylene diamine with adipic acid and commercially available for example from Mitsubishi Gas Chemical Company.

Exemplary polyesters for use herein are preferably characterized by the following chemical structure

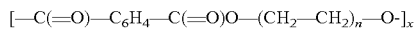

wherein n is an integer from 1 to 10, with preferred values being 1 or 2.

Specific examples of suitable polyesters are polyethylene terephthalate (PET) and polybutylene terephthalate (PBT). Furthermore, preferred polyesters are poly(hydroxy carboxylic acid)s.

With respect to the melt flow index of the polypropylene composition, it is preferred that it is within the same ranges and values as defined above for the metallocene random copolymer.

Thermoplastic Polymer Composition

If present, a thermoplastic polymer composition used herein consists of one or more thermoplastic polymers as defined above with respect to the polypropylene composition.

Irrespectively of the number of components of the thermoplastic polymer composition it is understood that their weight percentages, relative to the total weight of said thermoplastic polymer composition, add up to 100 wt %.

With respect the the melt flow index of the one or more thermoplastic polymer compositions, it is preferred that they are within the same ranges and values as defined above for the metallocene random copolymer.

Production of Fibers and Nonwovens

The fibers of the present application are produced by commonly known production methods, such as for example described in Polypropylene Handbook, ed. Nello Pasquini, $2^{nd}$ edition, Hanser, 2005, pages 397-403 or in F. Fourné, Synthetische Fasern, Carl Hanser Verlag, 1995, chapter 5.2 or in B. C. Goswami et al., Textile Yarns, John Wiley & Sons, 1977, p. 371-376. Generally, fibers are produced by melting a polymer or a polymer composition in an extruder, optionally passing the molten polymer through a melt pump to ensure a constant feeding rate and then extruding the molten polymer or molten polymer composition through a number of fine capillaries of a spinneret to form fibers. These still molten fibers are simultaneously cooled by air and drawn to a final diameter and are finally collected. Optionally, the so-obtained fibers may be subjected to a further drawing step, though for the present application it is preferred they are as-spun, i.e. that no further drawing step is performed on the fibers.

Thus, the process for producing the fibers as defined above comprises the steps of
- (a) polymerizing propylene and at least one comonomer in presence of a metallocene-based polymerization catalyst, to obtain a metallocene random copolymer of propylene and at least one comonomer;
- (b) melt-extruding a polypropylene composition comprising the metallocene random copolymer obtained in step (a) to obtain a molten polypropylene stream;
- (c) extruding the molten polypropylene stream of step (b) from a number of fine, usually circular, capillaries of a spinneret, thus obtaining filaments of molten polypropylene; and
- (d) subsequently rapidly reducing the diameter of the filaments obtained in the previous step to obtain a final diameter;

wherein said metallocene random copolymer is as defined above.

For the production of fibers comprising said polypropylene composition and one or more thermoplastic polymer compositions, the process comprises the steps of
- (a) polymerizing propylene and at least one comonomer in presence of a metallocene-based polymerization catalyst, to obtain a metallocene random copolymer of propylene and at least one comonomer;
- (a') providing a thermoplastic polymer composition as defined earlier in this application to a further extruder;
- (b) subsequently melt-extruding the polypropylene composition to obtain a molten polypropylene stream;
- (b') subsequently melt-extruding the thermoplastic polymer composition to obtain a molten thermoplastic polymer stream;
- (c) extruding the molten polypropylene stream of step (b) from a number of fine, usually circular, capillaries of a die, thus obtaining extrudates of molten polypropylene;
- (c') extruding the molten thermoplastic polymer stream of step (b') through a number of fine openings surrounding the capillaries of step (b), thus obtaining extrudates of molten thermoplastic polymer; and
- (c") combining the extrudates obtained in steps (c) and (c') to form single filaments of an intermediate diameter, such that an extrudate of step
- (c') covers at least 70% of the surface of the fine polypropylene fiber, and
- (d) subsequently cooling and reducing the titer of the filaments obtained in step (c) to a final fiber titer to obtain fine polypropylene fibers.

For the production of multicomponent fibers, i.e. fibers consisting of more than two components, one or more further polymer compositions, such as for example a further polypropylene composition or a further thermoplastic polymer composition, may in turn be fed to separate extruders, subsequently melt extruded to form the respective extrudates, which are then combined with the extrudates of steps (c) and (c') to form single filaments.

The polypropylene nonwovens of the present application may be produced by any suitable methods. Such methods include thermal bonding of staple fibers, the spunlacing process, and the spunbonding process. The preferred method is the spunbonding process.

Preferably, in addition to the above described process steps (a), (b), (c) to (d), respectively (a), (a'), (b), (b'), (c), (c'), (c") and (d) the process for producing nonwovens comprising the fibers of the present application further comprises the steps of
- (e) collecting the fine filaments obtained in step (d) on a support; and
- (f) subsequently bonding the collected fine polypropylene fibers of step (e) to form a bonded nonwoven.

For the production of thermally bonded nonwovens the present fibers are cut into staple fibers having a length in the range from 5 to 30 mm. Said staple fibers are then carded, i.e. collected as a more or less continuous non-consolidated web on a support. In a final step the non-consolidated web is consolidated by thermal or chemical bonding, with thermal bonding being preferred.

In the spunlacing process continuous fibers or staple fibers are distributed randomly a support to form a non-consolidated web, which is then consolidated by means of fine high-pressure water jets and dried.

In the spunbonding process a thermoplastic polymer is melted in a first extruder, optionally passed through a melt pump to ensure a constant feeding rate and then extruded through a number of fine, usually circular capillaries of a spinneret.

For the production of multicomponent fibers, i.e. fibers comprising the polypropylene composition and one or more thermoplastic polymer compositions as defined above, for example bicomponent fibers, further polymer blends are melted in further extruders, optionally passed through a melt pump, and then extruded through a number of fine openings surrounding the fine, usually circular capillaries of the spinneret. The various extrudates are then combined to form a single-essentially still molten—filament of an intermediate diameter. The filament formation can either be done by using one single spinneret with a large number of holes, generally several thousand, or by using several smaller spinnerets with a correspondingly lower number of holes per spinneret. After exiting from the spinneret, the still molten filaments are quenched by a current of air. The diameter of the filaments is then quickly reduced by a flow of high-pressure air. Air velocities in this drawdown step can range up to several thousand meters per minute. After drawdown the filaments are collected on a support, for example a forming wire or a porous forming belt, thus first forming an unbonded web, which is then passed through compaction rolls and finally through a bonding step. Bonding of the fabric may be accomplished by thermobonding, hydroentanglement, needle punching, or chemical bonding.

Composites may be formed from two or more nonwovens, of which at least one comprises fine polypropylene fibers defined above. Said two or more nonwovens may either be bonded together, or they may be left "unbonded" to one another, i.e. just placed on top of each other. In particular, the composites comprise a spunlace or spunbond nonwoven layer (S) according to the present invention or a melt blown nonwoven layer (M) according to the present invention. Composites in accordance with the present invention can for example be SS, SSS, SMS, SMMSS or any other combination of spunlace or spunbond and melt blown nonwoven layers.

A first nonwoven or composite, said first nonwoven or composite comprising the fine polypropylene fibers defined above, and a film may be combined to form a laminate. The film preferably is a polyolefin film. The laminate is formed by bringing the first nonwoven or composite and the film together and laminating them to one another for example by passing them through a pair of lamination rolls. The laminates may further include a second nonwoven or composite, which can be but need not be according to the present invention, on the face of the film opposite to that of the first nonwoven or composite. In a preferred embodiment, the film of the laminate is a breathable polyolefin film, thus resulting in a laminate with breathable properties.

The polypropylene fibers and filaments described herein can be used in carpets, woven textiles, and nonwovens.

The polypropylene spunbond nonwovens of the present invention as well as composites or laminates comprising it can be used for hygiene and sanitary products, such as for example diapers, feminine hygiene products and incontinence products, products for construction and agricultural applications, medical drapes and gowns, protective wear, lab coats, wipes, for example in sanitary but also in industrial applications, etc.

With regards to the production of nonwoven, particularly of spunbond nonwoven, the advantages of the present invention are seen in allowing an increase in the speed of the support on which the fibers are collected, i.e. an increase in the speed of the support in step (e) of the present process, due to the fact that the polypropylene composition requires less energy in order to achieve good bonding. This is or particular advantage in the production of laminates comprising a melt blown fibers. When used in combination with known polypropylene compositions and under the respective process conditions in the bonding step, melt blown fibers, these tend to stick to the calender rolls. Using the present fibers this problem can be avoided because either the line can be sped up while keeping the same process conditions as for known polypropylene compositions or the process conditions, particularly the temperature of the calender, can be reduced.

The present fibers are also thought to result in a broader bonding window in the bonding step. This should allow more freedom in adapting and optimizing process conditions for the bonding step, particularly when laminates are produced.

In terms of mechanical properties, the present fibers and nonwovens are expected to offer improved elongation with respect to that of a metallocene propylene homopolymer while having a strength comparable to that of a metallocene propylene homopolymer.

Test Methods

Molecular weights are determined by Size Exclusion Chromatography (SEC) at high temperature (145° C.). A 10 mg polypropylene sample is dissolved at 160° C. in 10 ml of trichlorobenzene (technical grade) for 1 hour. Analytical conditions for the GPCV 2000 from WATERS are:

Injection volume: +/−400 μl
Automatic sample preparation and injector temperature: 160° C.
Column temperature: 145° C.
Detector temperature: 160° C.
Column set: 2 Shodex AT-806MS and 1 Styragel HT6E
Flow rate: 1 ml/min
Detector: Infrared detector (2800-3000 cm$^{-1}$)
Calibration: Narrow standards of polystyrene (commercially available)
Calculation for polypropylene: Based on Mark-Houwink relation ($\log_{10}(M_{PP})=\log_{10}(M_{PS})-0.25323$); cut-off on the low molecular weight end at $M_{PP}=1000$.

The molecular weight distribution (MWD) is then calculated as $M_w/M_n$.

Xylene solubles (XS), i.e. the xylene soluble fraction, are determined as follows: Between 4.5 and 5.5 g of propylene polymer are weighed into a flask and 300 ml xylene are added. The xylene is heated under stirring to reflux for 45 minutes. Stirring is continued for 15 minutes without heating. The flask is then placed in a thermostat bath set to 25° C.+/−1° C. for 1 hour. The solution is filtered through Whatman n° 4 filter paper and 100 ml of solvent are collected. The solvent is then evaporated and the residue dried and weighed. The percentage of xylene solubles ("XS"), i.e. the amount of the xylene soluble fraction, is then calculated according to XS(in wt %)=(Weight of the residue/Initial total weight of PP)*300 with all weights being in the same unit, such as for example in grams.

The $^{13}$C-NMR analysis is performed using a 400 MHz Bruker NMR spectrometer under conditions such that the signal intensity in the spectrum is directly proportional to the total number of contributing carbon atoms in the sample. Such conditions are well known to the skilled person and include for example sufficient relaxation time etc. In practice the intensity of a signal is obtained from its integral, i.e. the corresponding area. The data is acquired using proton decoupling, 4000 scans per spectrum, a pulse repetition delay of 20 seconds and a spectral width of 26000 Hz. The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard.

To give an example, about 200 mg of polymer are dissolved in 2.0 ml of TCB, followed by addition of 0.5 ml of $C_6D_6$ and 2 to 3 drops of HMDS.

Following data acquisition the chemical shifts are referenced to the signal of the internal standard HMDS, which is assigned a value of 2.03 ppm.

The isotacticity is determined by $^{13}$C-NMR analysis on the total polymer. In the spectral region of the methyl groups the signals corresponding to the pentads mmmm, mmmr, mmrr and mrrm are assigned using published data, for example A. Razavi, Macromol. Symp., vol. 89, pages 345-367. Only the pentads mmmm, mmmr, mmrr and mrrm are taken into consideration due to the weak intensity of the signals corresponding to the remaining pentads. For the signal relating to the mmrr pentad a correction is performed for its overlap with a methyl signal related to 2.1-insertions. The percentage of mmmm pentads is then calculated according to % mmmm=AREA$_{mmmm}$/(AREA$_{mmmm}$+AREA$_{mmmr}$+AREA$_{mmrr}$+AREA$_{mrrm}$)·100

Determination of the percentage of 2.1-insertions for a metallocene propylene homopolymer: The signals corresponding to the 2.1-insertions are identified with the aid of published data, for example H. N. Cheng, J. Ewen, Makromol. Chem., vol. 190 (1989), pages 1931-1940. A first area, AREA1, is defined as the average area of the signals corresponding to 2.1-insertions. A second area, AREA2, is defined as the average area of the signals corresponding to 1.2-insertions. The assignment of the signals relating to the 1.2-insertions is well known to the skilled person and need not be explained further. The percentage of 2.1-insertions is calculated according to 2.1-insertions(in %)=AREA1/(AREA1+AREA2)·100 with the percentage in 2.1-insertions being given as the molar percentage of 2.1-inserted propylene with respect to total propylene.

The determination of the percentage of 2.1-insertions for a metallocene random copolymer of propylene and ethylene is determined by two contributions:
(i) the percentage of 2.1-insertions as defined above for the propylene homopolymer, and
(ii) the percentage of 2.1-insertions, wherein the 2.1-inserted propylene neighbors an ethylene,
thus the total percentage of 2.1-insertions corresponds to the sum of these two contributions. The assignments of the signal for case (ii) can be done either by using reference spectra or by referring to the published literature.

Melting temperatures $T_{melt}$ were determined by Differential Scanning Calorimetry (DSC) according to ISO 3146 on a DSC Q2000 instrument by TA Instruments. To erase the thermal history the samples are first heated to 200° C. and kept at 200° C. for a period of 3 minutes. The reported melting temperatures $T_{melt}$ are then determined with heating and cooling rates of 20° C./min.

Fiber tenacity and elongation were measured on a Lenzing Vibrodyn according to ISO 5079:1995 with a testing rate of 10 mm/min.

Tensile strength and elongation of nonwovens were measured according to ISO 9073-3:1989.

The invention claimed is:

1. A process for the production of fibers comprising:
(a) polymerizing propylene and at least one comonomer in presence of a metallocene-based polymerization catalyst, to obtain a metallocene random copolymer of propylene and at least one comonomer;
(b) melt-extruding a polypropylene composition comprising the metallocene random copolymer obtained in step (a) to obtain a molten polypropylene stream;
(c) extruding the molten polypropylene stream of step (b) from capillaries of a spinneret, thus obtaining filaments of molten polypropylene; and
(d) subsequently rapidly reducing a diameter of the filaments to obtain a final diameter;
wherein said metallocene random copolymer has a comonomer content of from 1.2 wt % to 1.8 wt %, relative to a total weight of said metallocene random copolymer;
wherein the at least one comonomer is ethylene; and
wherein said metallocene random copolymer has a molecular weight distribution, defined as Mw/Mn and determined by gel permeation chromatography, of from 1.0 to 3.0, obtained without thermal or chemical degradation; a melt flow index of at least 25 dg/min and at most 50 dg/min, determined according to ISO 1133, condition L, at 230° C. and 2.16 kg; and a melting temperature $T_{melt}$, determined by Differential Scanning Calorimetry according to ISO 3146, of at most 140° C.

2. The process according to claim 1, further comprising:
(e) collecting the filaments obtained in step (d) on a support; and
(f) subsequently bonding the collected filaments of step (e) to form a bonded nonwoven.

3. The process according to claim 1, wherein the metallocene random copolymer has a comonomer content ranging from at least 1.3 wt % to at most 1.7 wt %, relative to the total weight of said metallocene random copolymer.

4. The process according to claim 1, wherein the metallocene random copolymer has a content of mmmm pentads of at least 90%.

5. The process according to claim 1, wherein the metallocene random copolymer has at least 0.1% and at most 1.0% of 2.1-insertions, relative to the total number of propylene molecules.

6. The process according to claim 1, wherein the metallocene random copolymer has at least 90 mole % of the at least one comonomer as isolated units.

7. The process according to claim 1, wherein the polypropylene composition further comprises a thermoplastic polymer composition having components selected from propylene homopolymers and random copolymers of propylene and at least one comonomer, with the provision that said random copolymer of propylene and at least one comonomer comprised in said thermoplastic polymer composition is different from the metallocene random copolymer of propylene and at least one comonomer.

8. The process of claim 7, wherein the polypropylene composition forms an interior component and the thermoplastic polymer composition forms an exterior component, wherein the exterior component covers at least 70% of a surface of the fibers.

9. The process of claim 8, wherein the exterior component covers at least 80% of the surface of the fibers.

10. The process of claim 8, wherein the exterior component covers at least 99% of the surface of the fibers.

11. The process of claim 7, wherein the polypropylene composition forms an exterior component and the thermoplastic polymer composition forms an interior component, wherein the exterior component covers at least 70% of a surface of the fibers.

12. The process of claim 11, wherein the exterior component covers at least 80% of the surface of the fibers.

13. The process of claim 11, wherein the exterior component covers at least 99% of the surface of the fibers.

14. The process according to claim 7, wherein the metallocene random copolymer has a comonomer content ranging from at least 1.4 wt % to at most 1.6 wt %, relative to the total weight of said metallocene random copolymer.

15. The process according to claim 1, wherein the metallocene random copolymer has a comonomer content ranging from at least 1.4 wt % to at most 1.6 wt %, relative to the total weight of said metallocene random copolymer.

16. The process of claim 1, wherein the polypropylene composition further comprises one or more thermoplastic polymers selected from the group consisting of polyamides, polyesters, and polyolefins different from the metallocene random copolymer.

* * * * *